(12) United States Patent
Lesner et al.

(10) Patent No.: US 10,607,300 B1
(45) Date of Patent: Mar. 31, 2020

(54) AD HOC ELECTRONIC MESSAGING USING FINANCIAL TRANSACTION DATA

(71) Applicant: INTUIT INC., Mountain View, CA (US)

(72) Inventors: Christopher Z. Lesner, Palo Alto, CA (US); Alexander S. Ran, Palo Alto, CA (US)

(73) Assignee: INTUIT INC., Mountain View, CA (US)

( * ) Notice: Subject to any disclaimer, the term of this patent is extended or adjusted under 35 U.S.C. 154(b) by 575 days.

(21) Appl. No.: 14/814,998

(22) Filed: Jul. 31, 2015

(51) Int. Cl.
*G06Q 50/00* (2012.01)
*H04L 12/58* (2006.01)

(52) U.S. Cl.
CPC ............ *G06Q 50/01* (2013.01); *H04L 51/14* (2013.01); *H04L 51/24* (2013.01)

(58) Field of Classification Search
CPC .......... G06Q 50/01; H04L 51/14; H04L 51/24
USPC ....................................................... 705/319
See application file for complete search history.

(56) References Cited

U.S. PATENT DOCUMENTS

| | | | | |
|---|---|---|---|---|
| 9,530,160 B2* | 12/2016 | Lau | | G06Q 30/0207 |
| 2004/0204989 A1* | 10/2004 | Dicker | | G06Q 30/02 |
| | | | | 705/14.13 |
| 2005/0060218 A1* | 3/2005 | Coutts | | G06Q 10/0631 |
| | | | | 705/7.13 |
| 2011/0161165 A1* | 6/2011 | Gierkink | | G06Q 20/102 |
| | | | | 705/14.45 |
| 2011/0184937 A1* | 7/2011 | Jin | | G06Q 10/107 |
| | | | | 707/722 |
| 2013/0132196 A1* | 5/2013 | Hurst | | G06Q 30/02 |
| | | | | 705/14.53 |
| 2014/0250117 A1* | 9/2014 | Behforooz | | G06Q 50/01 |
| | | | | 707/728 |
| 2014/0257922 A1* | 9/2014 | Jouhikainen | | G06Q 30/0201 |
| | | | | 705/7.29 |
| 2015/0170213 A1* | 6/2015 | O'Malley | | G06Q 30/0267 |
| | | | | 705/14.41 |
| 2015/0193768 A1* | 7/2015 | Douglas | | G06Q 20/4016 |
| | | | | 705/44 |

OTHER PUBLICATIONS

Ballantine. The Ultimate Guide to Boosting Your Direct Mail Response Rate. ballantine.com. Feb. 23, 2015. [Retrieved on: May 3, 2018]. Retrieved from internet: <URL:https://www.ballantine.com/ultimate-guide-boosting-direct-mail-response-rate/>. entire document (Year: 2015).*

(Continued)

*Primary Examiner* — Tamara Griffin
(74) *Attorney, Agent, or Firm* — Patterson + Sheridan, LLP

(57) ABSTRACT

The disclosed embodiments provide a system that facilitates electronic communication among users. During operation, the system obtains financial data as a set of financial transactions. Upon receiving a request to transmit a message, the system obtains one or more recipient attributes from the request. Next, the system uses the financial transactions to identify a set of recipients that matches the one or more recipient attributes. The system then transmits the message to the set of recipients without revealing the PII for the set of recipients to a creator of the message.

20 Claims, 7 Drawing Sheets

(56) References Cited

OTHER PUBLICATIONS

Flatworld solutions. Mailing List Compilation Services. flatworldsolutions.com. Jun. 21, 2009. [Retrieved on: May 3, 2018]. Retrieved from internet: <URL:https://web.archive.org/web/20090621112457/https://www.flatworldsolutions.com/data-management/mailing-list-compilation.php>. entire document (Year: 2009).*

FSSI. Outsource Direct Mail Services. fssi-ca.com. Apr. 20, 2015. [Retrieved on: May 3, 2018]. Retrieved from internet: <URL:https://web.archive.org/web/20150420020449/http://www.fssi-ca.com:80/services/marketing/outsource-direct-mail/>. entire document (Year: 2015).*

Yakuel. How to Treat Every Customer Campaign as a Marketing Experiment. optimove.com. Apr. 14, 2013. [Retrieved on: Jul. 23, 2018]. Retrieved from internet: <URL:https://www.optimove.com/blog/treat-every-customer-campaign-as-a-marketing-experiment>. entire document (Year: 2013).*

Thinkwithgoogle. A Revolution in Measuring Ad Effectiveness: Knowing Who Would Have Been Exposed. thinkwithgoogle.com. May 2015. [Retrieved: Jul. 23, 2018]. <URL:https://www.thinkwithgoogle.com/intl/en-gb/marketing-resources/data-measurement/a-revolution-in-measuring-ad-effectiveness/> entire document. (Year: 2015).*

Metz. Facebook Rolls Out a Tool for Testing Ads With Control Groups. wired.com. Jan. 27, 2015. [Retrieved on: Jul. 23, 2018]. Retrieved from internet: <URL:https://www.wired.com/2015/01/facebook-rolls-online-tool-testing-ads-control-groups/>. entire document (Year: 2015).*

* cited by examiner

AD HOC ELECTRONIC MESSAGING USING FINANCIAL TRANSACTION DATA

BACKGROUND

Related Art

The disclosed embodiments relate to techniques for facilitating electronic communication. More specifically, the disclosed embodiments relate to techniques for performing ad hoc electronic messaging using financial transaction data.

Electronic messaging has greatly improved the speed and ease of modern communication. For example, users may use emails, text messages, instant messages, voicemails, online forums, social media posts, and/or other forms of digital communications to reach one another independently of geographic distance or location.

However, existing electronic communications mechanisms are limited in the ability to target users with messages based on arbitrary attributes of the users. On one hand, transmission of messages to specific sets of users may require knowledge of or access to personally identifiable information (PII) for the users, such as the users' names, email addresses, email list memberships, phone numbers, postal addresses, digital identities, and/or online usernames. On the other hand, messages that are publicly posted on social media, online forums, and/or question-and-answer (Q&A) systems may be delivered to large numbers of users but fail to reach users to whom the messages are the most relevant.

Consequently, electronic communications may be improved by transmitting messages to users based on the relevance of the messages to the users.

SUMMARY

Electronic messaging is widely used in everyday communication. For example, users may transmit emails, text messages, instant messages, voicemails, social media posts, and/or other forms of electronic communications to one another independently of geographic distance or location. To use such electronic communications, the users may address messages to one another using personally identifiable information (PII) such as names, email addresses, phone numbers, postal addresses, digital identities, and/or online usernames. Alternatively, the users may post messages to predefined groups and/or the public using mechanisms such as social media, email lists, newsgroups, online forums, review websites, and/or question-and-answer (Q&A) systems. As a result, the users may be unable to transmit messages to ad hoc groups of recipients that share common attributes using conventional electronic messaging mechanisms.

To enable ad hoc electronic messaging among the users, financial data for the set of users may be obtained as a set of financial transactions. When a user or other entity generates a request to transmit a message, one or more recipient attributes may be obtained from the message, and the financial transactions may be used to identify a set of recipients that matches the recipient attribute(s). The recipient attributes may include relationships (e.g., customer relationships, employment relationships, lending relationships, etc.) and/or transaction attributes (e.g., transaction dates, transaction amounts, transaction types, transaction categories, etc.) that can be extracted from the financial transactions.

To identify the recipients, the recipient attributes may be matched to a subset of the financial transactions, and the set of recipients may be identified as a group of users associated with the subset of the financial transactions. The message may then be transmitted to the recipients without revealing personally identifiable information (PIT) for the recipients to the message's creator. For example, the message may be delivered to the recipients through one or more offerings that perform tasks using the financial data.

Prior to transmitting the message, a number of verifications may be performed to improve the effectiveness or relevance of the message. First, the financial transactions may be used to verify one or more sender attributes of the creator. The sender attributes may overlap with or be complementary to the recipient attributes. For example, the financial transactions may be used to verify that the creator of the message and the recipients share the attribute of purchasing goods or services from the same merchant before the creator is allowed to contact the recipients with information or a question related to the merchant. Alternatively, the financial transactions may be used to verify that the creator of the message is the merchant or a competitor of the merchant.

Second, the recipient attributes may be matched to a context of the message to verify a relevance of the message to the recipients. The context may include metadata and/or other information related to the message. For example, the context may include the message's date or time of creation, source (e.g., web page), and/or content, as well as other information displayed with the message. If the context sufficiently matches the recipient attributes, the message may be deemed relevant to the recipients and delivered to the recipients. Such attribute-based verification and transmission of messages may thus enable the delivery of relevant or authentic messages to ad hoc groups of users without requiring identification of the users by the message creators or compromising the users' identities.

The disclosed embodiments provide a system that facilitates electronic communication among users. During operation, the system obtains financial data as a set of financial transactions. Upon receiving a request to transmit a message, the system obtains one or more recipient attributes from the request. Next, the system uses the financial transactions to identify a set of recipients that matches one or more recipient attributes. The system then transmits the message to the set of recipients without revealing the PII for the set of recipients to a creator of the message.

In some embodiments, using the financial transactions to identify the set of recipients that matches the one or more recipient attributes includes storing the one or more recipient attributes in memory, and storing, in memory, a mapping of one or more recipient attributes to a set of identifiers for the set of recipients.

In some embodiments, the system also uses the financial transactions to verify one or more sender attributes of the creator prior to transmitting the message to the set of recipients.

In some embodiments, the one or more sender attributes include a recipient attribute in the one or more recipient attributes.

In some embodiments, the system also matches one or more recipient attributes to a context of the message to verify a relevance of the message to the set of recipients prior to transmitting the message to the set of recipients.

In some embodiments, obtaining the financial data includes using stored authentication credentials to access online accounts, and aggregating the financial data from the set of online accounts.

In some embodiments, using the financial transactions to identify the set of recipients that matches the one or more recipient attributes includes matching the one or more recipient attributes to a subset of the financial transactions, and identifying the set of recipients as one or more of the users associated with the subset of the financial transactions.

In some embodiments, transmitting the message to the set of recipients includes delivering the message to the set of recipients through one or more offerings that perform tasks using the financial data.

In some embodiments, the system also obtains the message from public content. Next, the system extracts the one or more recipient attributes from a context of the message. The system then includes the one or more recipient attributes in the request.

In some embodiments, the one or more recipient attributes include a business relationship.

In some embodiments, the one or more recipient attributes include a transaction attribute of the financial transactions.

BRIEF DESCRIPTION OF THE FIGURES

In the figures, like reference numerals refer to the same figure elements.

DETAILED DESCRIPTION

Figure 1:
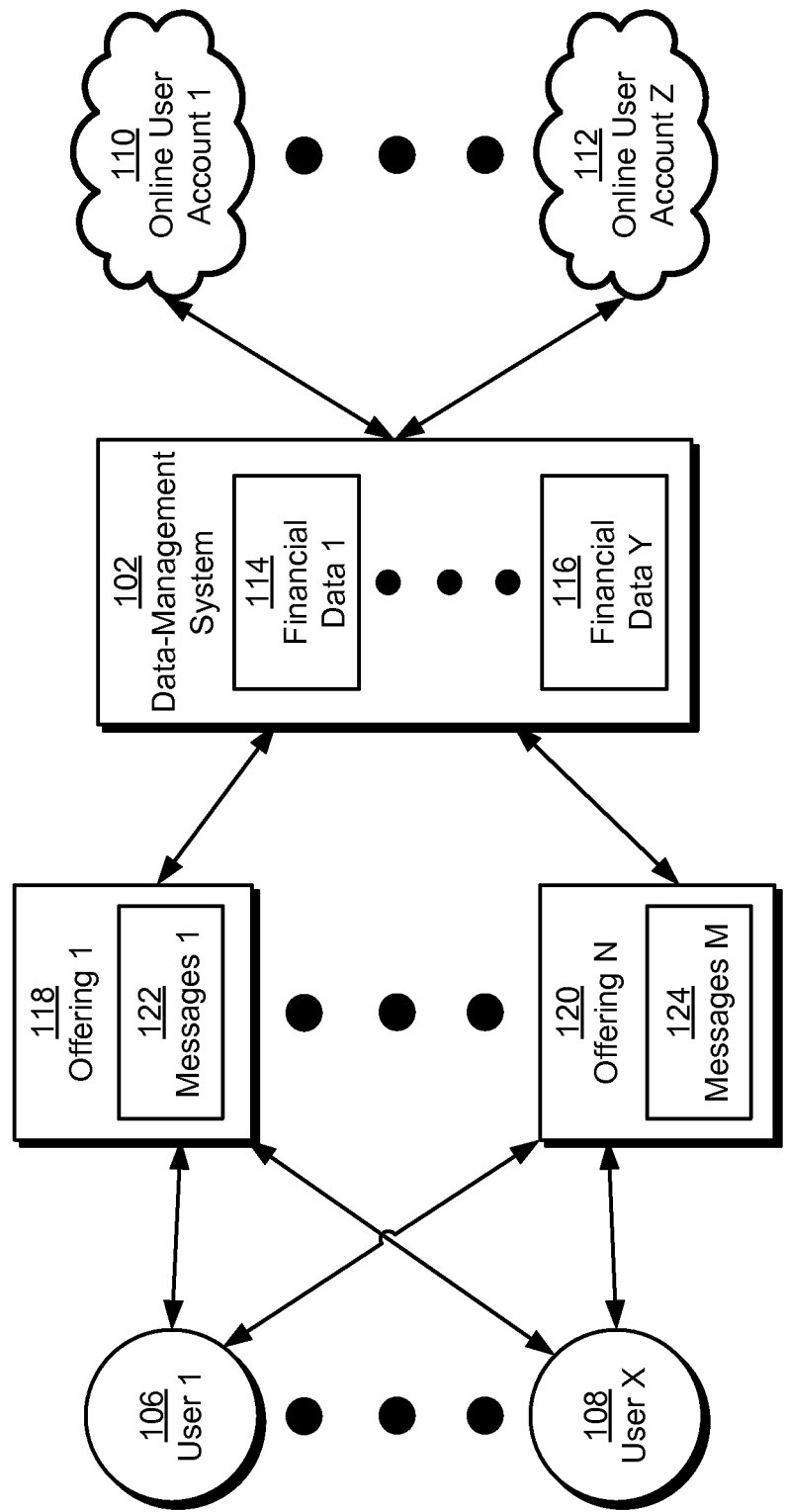
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Electronic messaging is widely used in everyday communication. For example, users may transmit emails, text messages, instant messages, voicemails, social media posts, and/or other forms of electronic communications to one another independently of geographic distance or location. To use such electronic communications, the users may address messages to one another using personally identifiable information (PII) such as names, email addresses, phone numbers, postal addresses, digital identities, and/or online usernames. Alternatively, the users may post messages to predefined groups and/or the public using mechanisms such as social media, email lists, newsgroups, online forums, review websites, and/or question-and-answer (Q&A) systems. There is no mechanism that enables users to transmit messages to ad hoc groups of recipients that share common attributes using conventional electronic messaging mechanisms.

To enable ad hoc electronic messaging among the users, financial data for the set of users may be obtained as a set of financial transactions. When a user or other entity generates a request to transmit a message, one or more recipient attributes may be specified with the message, and the financial transactions may be used to identify a set of recipients that matches the specified recipient attribute(s). The recipient attributes may include relationships (e.g., customer relationships, employment relationships, lending relationships, etc.), transaction attributes (e.g., transaction dates, transaction amounts, transaction types, transaction categories, etc.), and/or any other factors that are present in or can be derived from the data about users and their financial transactions.

To identify the recipients, the recipient attributes may be matched to a subset of the financial transactions, and the set of recipients may be identified as a group of users associated with the subset of the financial transactions. The message may then be transmitted to the recipients without the message's creator having to know any personally identifiable information (PII) about the recipients and without revealing the PII for the recipients to the message's creator. For example, the message may be delivered to the recipients through one or more offerings that perform tasks using the financial data.

Prior to transmitting the message, a number of verifications may be performed to improve the effectiveness or relevance of the message. First, the financial transactions may be used to verify one or more sender attributes of the creator. The sender attributes may overlap with or be complementary to the recipient attributes. For example, the financial transactions may be used to verify that the creator of the message and the recipients share the attribute of purchasing goods or services from the same merchant before the creator is allowed to address a message to other users who have conducted business with the merchant during the same period, with information or a question related to the merchant. Alternatively, the financial transactions may be used to verify that the creator of the message stands in a known relationship to the merchant (e.g., is the merchant or is a competitor of the merchant).

Second, the recipient attributes may be matched to a context of the message to verify a relevance of the message to the recipients. The context may include metadata and/or other information related to the message. For example, the context may include the message's date or time of creation, source (e.g., web page), and/or content, as well as other information displayed with the message. If the context sufficiently matches the recipient attributes, the message may be deemed relevant to the recipients and delivered to the recipients. Such attribute-based verification and transmission of messages may thus enable the delivery of relevant or authentic messages to ad hoc groups of users without requiring identification of the users by the message creators or compromising the users' identities.

In order to ensure message relevance to the group of users identified by the message's recipient attributes, a collaborative filtering mechanism can be used. For example, if a certain number of early message recipients down vote a message, the message is not transmitted to the rest of the group. This is especially important when the financial transactions of the sender of the message cannot be used to verify that the sender belongs to the same group as the recipients.

FIG. 1 shows a schematic of a system in accordance with the disclosed embodiments. The system includes a data-management system 102 that interacts with a number of online user accounts (e.g., online user account 1 110, online user account z 112) and a number of offerings (e.g., offering 1 118, offering n 120).

Data-management system 102 may aggregate financial data (e.g., financial data 1 114, financial data y 116) associated with the online user accounts and provide the financial data to the offerings. A set of users (e.g., user 1 106, user x 108) may use the offerings to access, store, and/or manipulate the financial data. For example, data-management system 102 may aggregate the financial data from online banking accounts and/or other financial accounts of the users. The aggregated financial data may include bills, invoices, receipts, tax forms, statements, account balances, paychecks, and/or financial documents of the users. The offerings may obtain the aggregated financial data from data-management system 102 and display the financial data to the users. The financial data may be obtained from products and services used for generating payroll, tracking inventory, managing invoices, managing finances, creating a budget, filing taxes, paying bills, tracking financial transactions, and/or generating reports.

As a result, data-management system 102 may provide a centralized mechanism for aggregating financial data from online user accounts with various financial institutions and/or other providers of financial data. The financial data may then be used by a number of software offerings related to financial management and/or accounting, such as tax-preparation applications, small-business accounting applications, and/or personal financial management applications.

To obtain the financial data, data-management system 102 may interface with financial institutions, government agencies, merchants, employers, and/or other providers of financial data. For example, data-management system 102 may communicate with the providers over one or more networks, such as local area networks (LANs), wide area networks (WANs), personal area networks (PANs), virtual private networks, intranets, cellular networks, Wi-Fi (Wi-Fi® is a registered trademark of Wi-Fi Alliance) networks, Bluetooth (Bluetooth® is a registered trademark of Bluetooth SIG, Inc.) networks, universal serial bus (USB) networks, and/or Ethernet networks. During communication with the providers, data-management system 102 may use web services and/or other network-based services to log in to the online user accounts and obtain financial data from the online user accounts. For example, data-management system 102 may obtain authentication credentials for the online user accounts from the users, access the online user accounts using the authentication credentials, and use predetermined user flows with the providers to navigate to web pages containing the financial data and scrape the financial data from the web pages.

In one or more embodiments, data-management system 102 includes functionality to use the aggregated financial data to perform ad hoc electronic messaging among the users. As described in further detail below, data-management system 102 may obtain the financial data as a set of financial transactions associated with the users. Next, data-management system 102 may process requests to transmit messages (e.g., messages 1 122, messages m 124) by obtaining one or more recipient attributes from each request and using the financial transactions to identify a set of recipients that matches the recipient attribute(s). Data-management system 102 may then transmit the message to the set of recipients (e.g., through one or more offerings used by the recipients) without revealing the PII for the set of recipients to a creator of the message. Consequently, data-management system 102 may allow relevant messages to reach the users through the offerings without requiring the creators or senders of the messages to manually identify the users or revealing the identities of the users to one another.

Figure 2:
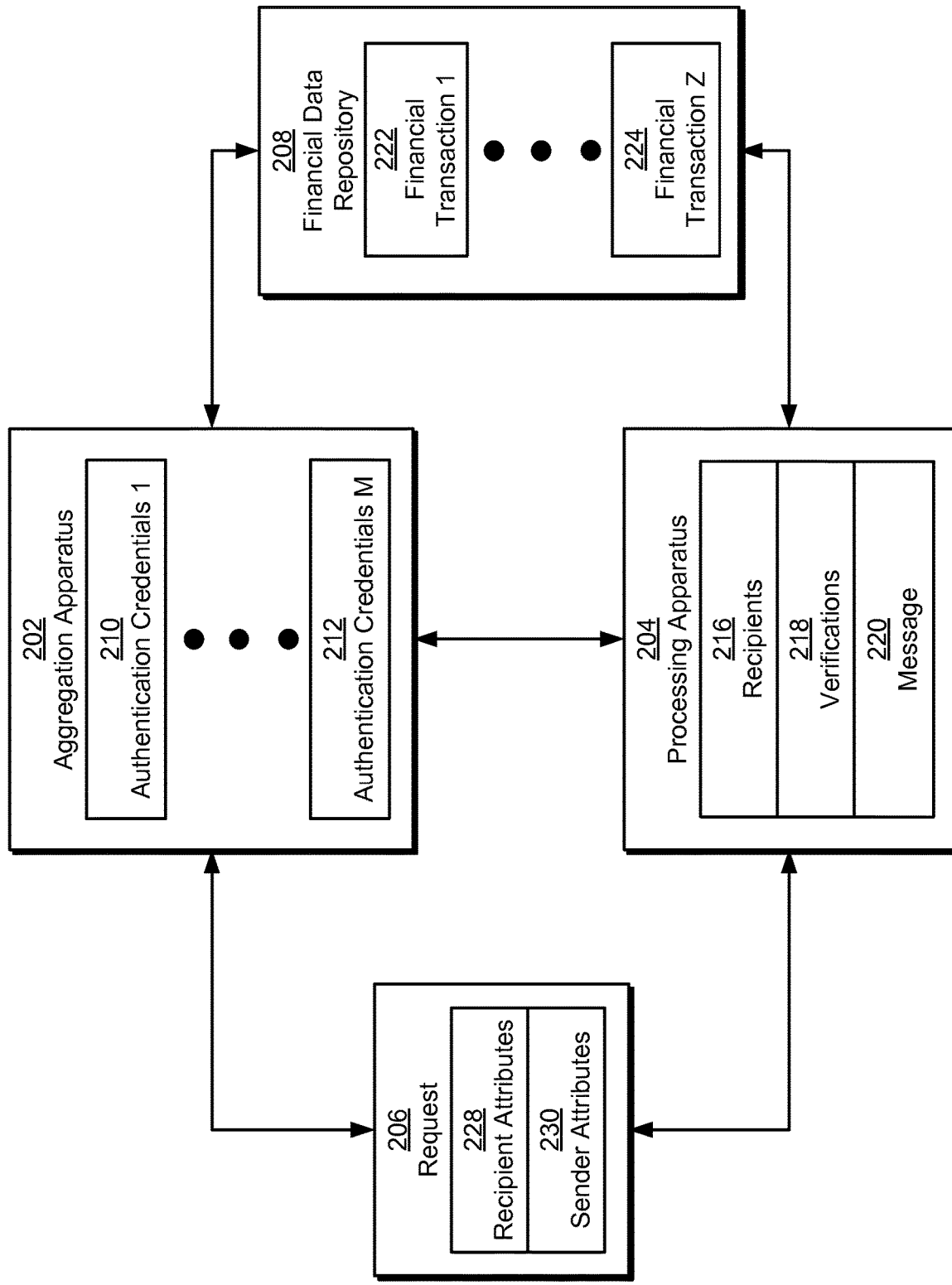
FIG. 2 shows a system for facilitating electronic communication among users in accordance with the disclosed embodiments.

FIG. 2 shows a system for facilitating electronic communication among users in accordance with the disclosed embodiments. The system may be a data-management system, such as data-management system 102 of FIG. 1. As shown in FIG. 2, the system includes an aggregation apparatus 202 and a processing apparatus 204. Each of these components is described in further detail below.

Aggregation apparatus 202 may aggregate financial data from a number of online user accounts. As mentioned above, the online user accounts may be associated with financial institutions, government agencies, employers, merchants, and/or other providers of financial data. To aggregate the financial data, aggregation apparatus 202 may obtain authentication credentials (e.g., authentication credentials 1 210, authentication credentials m 212) for each online user account and use the authentication credentials to access the online user account. For example, aggregation apparatus 202 may obtain a username and password, biometric identifier, personal identification number (PIN), certificate, and/or other authentication credentials for the online user account from an authentication repository (not shown) and use the authentication credentials to log in to the online user account as the user.

The stored authentication credentials may be provided by the users and stored for subsequent use by the data-management system. For example, the users may provide authentication credentials for online banking accounts and/or other types of online user accounts during registration with the data-management system. The users may also add new authentication credentials and/or modify existing authentication credentials during the addition and/or update of online user accounts within an offering that uses financial data aggregated by the data-management system.

Aggregation apparatus 202 may also use a set of predefined user flows for websites, web applications, and/or other web-based providers of the online user accounts to aggregate financial data from the online user accounts. Each user flow may identify a sequence and/or layout of user-interface elements, Uniform Resource Locators (URLs), web pages, files, and/or other attributes that may be used to navigate the online user accounts and aggregate financial data from the online user accounts. For example, aggregation apparatus 202 may use a user flow for a financial institution website to log in to a user's online banking account and navigate within the website to one or more web pages containing account information for the online banking account. Aggregation apparatus 202 may scrape the account information from the web page(s) and store the account information, along with other financial data from other online user accounts, in a financial data repository 208.

Alternatively, user data can be imported using a process specifically designed for this purpose, such as using an OAuth protocol whereby the user authenticates to a system that manages the source data (e.g., the user's financial institution) and authorizes aggregation apparatus 202 to access the user's data via interfaces specifically designed for this task. With this approach, aggregation apparatus 202 does not need to know the user's authentication credentials with their financial institution and/or other providers that manage the user's data.

As shown in FIG. 2, some or all of the financial data aggregated by aggregation apparatus 202 may be stored as a set of financial transactions (e.g., financial transaction 1 222, financial transaction z 224) in financial data repository 208. Each financial transaction may specify a type of the financial transaction, such as a deposit, withdrawal, fee, interest payment, transfer, loan payment, and/or bill payment. The financial transaction may also include information such as a transaction date, a transaction description, a transaction category (e.g., groceries, restaurants, ATM withdrawal, utilities, etc.), a transaction amount, a transaction status (e.g., pending, completed, denied, cancelled, etc.), and/or account information (e.g., account number, account owner, financial institution, etc.) for the financial account from which the financial transaction was aggregated.

As mentioned above, the system of FIG. 2 may process a request 206 to transmit a message 220 based on financial data in financial data repository 208. Request 206 may be received from a creator of message 220, or request 206 may be received from a sender that is not the creator of message 220. For example, request 206 may be generated by a user after the user creates message 220 to communicate with a given set of recipients 216. Conversely, message 220 may be obtained by aggregation apparatus 202 and/or another component of the data-management system from third-party public content such as a social media post, forum post, review, article, offer, and/or advertisement. The component may then generate request 206 to trigger delivery of message 220 through one or more offerings (e.g., offering 1 118, offering n 120 of FIG. 1) used by recipients 216. In other words, the component may identify relevant public content for transmission to recipients 216 through the data-management system.

Processing apparatus 204 may identify recipients 216 of message 220 based on one or more recipient attributes 228 from request 206. Recipient attributes 228 may include information that can be matched to financial transactions in financial data repository 208. For example, recipient attributes 228 may include business relationships such as a customer relationship between a customer and a business, an employment relationship between an employer and an employee, a landlord-tenant relationship between a landlord and a tenant, and/or a lending relationship between a lender and a borrower. Recipient attributes 228 may also include transaction attributes mentioned above, such as a transaction date or time, a transaction amount, a transaction type, a transaction category, a transaction status, and/or a transaction description. Recipient attributes 228 may also include attributes derived from the basic attributes mentioned above.

Recipient attributes 228 may be used by the creator and/or sender of message 220 to define an ad hoc set of recipients 216 of message 220. For example, the creator of message 220 may identify recipient attributes 228 as characteristics of other users to whom message 220 is likely to be relevant. As a result, the creator may use recipient attributes 228 to reach the other users without knowing the other users, providing PII for the other users, or using a predefined group or list containing the other users. In another example, a component of the data-management system may provide relevant content to the users by obtaining message 220 from public content, extracting recipient attributes 228 from the context or content of message 220, and including recipient attributes 228 in request 206.

To select recipients 216 based on recipient attributes 228, processing apparatus 204 may match recipient attributes 228 to a subset of the financial transactions in financial data repository 208. For example, processing apparatus 204 may include recipient attributes 228 as parameters of one or more queries of financial data repository 208 and receive the subset of financial transactions that match recipient attributes 228 in one or more responses to the queries.

Next, processing apparatus 204 may identify recipients 216 as a group of users associated with the subset of the financial transactions. For example, each financial transaction in financial data repository 208 may include metadata, such as a foreign key in a relational database table, which links the financial transaction to a user or user account with the data-management system. Processing apparatus 204 may use the foreign keys associated with the subset of financial transactions matching recipient attributes 228 to retrieve user data for a group of users involved in the financial transactions from a different relational database table in financial data repository 208 and/or another repository.

To increase the relevance or effectiveness of message 220, processing apparatus 204 may also perform one or more verifications 218 related to message 220. First, processing apparatus 204 may use the financial transactions to verify one or more sender attributes 230 of the sender of message 220. Sender attributes 230 may overlap with or be complementary to recipient attributes 228. For example, processing apparatus 204 may use the financial transactions to verify that the sender and recipients 216 share the attribute of purchasing goods or services from the same merchant. By verifying that the sender belongs to the same ad hoc group as recipients 216, processing apparatus 204 may reduce the transmission of fraudulent or irrelevant messages to recipients 216. In another example, the financial transactions may be used to verify that the sender is the merchant from whom recipients 216 have purchased goods or services, or alternatively is a competitor of the merchant. By verifying the sender as a current or potential provider of goods or services to recipients 216, processing apparatus 204 may allow the sender to target recipients 216 with news, announcements, offers, and/or other messages that are relevant to the shopping behavior or habits of recipients 216.

Second, processing apparatus 204 may match recipient attributes 228 to a context of message 220 to verify a relevance of message 220 to recipients 216. The context may include metadata and/or other information related to message 220. For example, the context for message 220 created from a product or business review may include one or more attributes of the product or business (e.g., name, location, product or business type, product or business characteristics, etc.), the review's date or time of creation, the source (e.g., web page) of the review, the content of the review, topics mentioned in the review, and/or other information or metadata included in or displayed with the review.

If the context sufficiently matches recipient attributes 228, message 220 may be identified as relevant to recipients 216. Continuing with the above example, the review may be deemed relevant to recipients 216 if the review is recent and recipients 216 have recently (e.g., in the last month) performed purchases associated with the product, business, and/or similar products or businesses; viewed other reviews of the product or business; and/or been in the vicinity of the business's location. Conversely, the review may be determined to be irrelevant to recipients 216 if the review is for a different product or business than purchased by recipients 216, as specified in recipient attributes 228, or if topics in the review are not related to topics associated with the product or business (e.g., if the review is flagged as spam).

As described above, a component of the data-management system may generate request 206 by extracting recipient attributes 228 from the context of message 220. As a result, processing apparatus 204 may skip context-based verification of the relevance of message 220 if the same context was previously used to generate request 206. More specifically, the data-management system may either generate request 206 by extracting recipient attributes 228 from the context of message 220 or verify that the context of message 220 associated with an externally generated request 206 (e.g., from a user) matches recipient attributes 228 before message 220 is transmitted to recipients 216.

After recipients 216 are identified and verifications 218 performed, processing apparatus 204 may transmit message 220 to recipients 216. For example, processing apparatus 204 may deliver message 220 to recipients 216 through one or more offerings (e.g., offering 1 118, offering n 120 of FIG. 1) that perform tasks using the financial data, as described in further detail below with respect to FIG. 3. Alternatively, processing apparatus 204 may deliver message 220 through other electronic communications mechanisms, such as email, social media, voicemail, text messaging, and/or instant messaging.

In addition, processing apparatus 204 may transmit message 220 without revealing PII for recipients 216 to the creator of message 220. For example, a user may submit request 206 to reach recipients 216 with message 220 without knowing the names, email addresses, mailing addresses, phone numbers, usernames, and/or PII for recipients 216. Processing apparatus 204 may use financial transactions in financial data repository 208, recipient attributes 228, and sender attributes 230 to identify recipients 216 within the data-processing system, verify the relevance of message 220 to recipients 216, and verify that the user is qualified to transmit message 220. Processing apparatus 204 may then deliver message 220 to recipients 216 through user accounts of recipients 216 in the data-processing system without revealing the usernames associated with the user accounts and/or other personal details of recipients 216 to the user. Consequently, aggregation apparatus 202 and processing apparatus 204 may perform ad hoc electronic messaging for users of the data-management system without requiring or compromising PII among the users involved in the messaging.

In some embodiments, collaborative filtering or ranking of the message 220 by recipients 216 may be used to further ensure the relevance of the message 220 to recipients 216. For example, recipients 216 may be given the opportunity to rate, upvote, and/or downvote message 220. If a certain initial subset of recipients 216 downvote message 220, message 220 is not transmitted to the remainder of recipients 216. This is especially important when the financial transactions of the sender or creator of message 220 cannot be used to verify that the sender belongs to the same group as recipients 220.

Those skilled in the art will appreciate that the system of FIG. 2 may be implemented in a variety of ways. For example, aggregation apparatus 202, processing apparatus 204, and financial data repository 208 may be provided by a single physical machine, multiple computer systems, one or more virtual machines, a grid, one or more databases, one or more file systems, and/or a cloud computing system. Aggregation apparatus 202 and processing apparatus 204 may additionally be implemented together and/or separately by one or more hardware and/or software components and/or layers.

Figure 3:
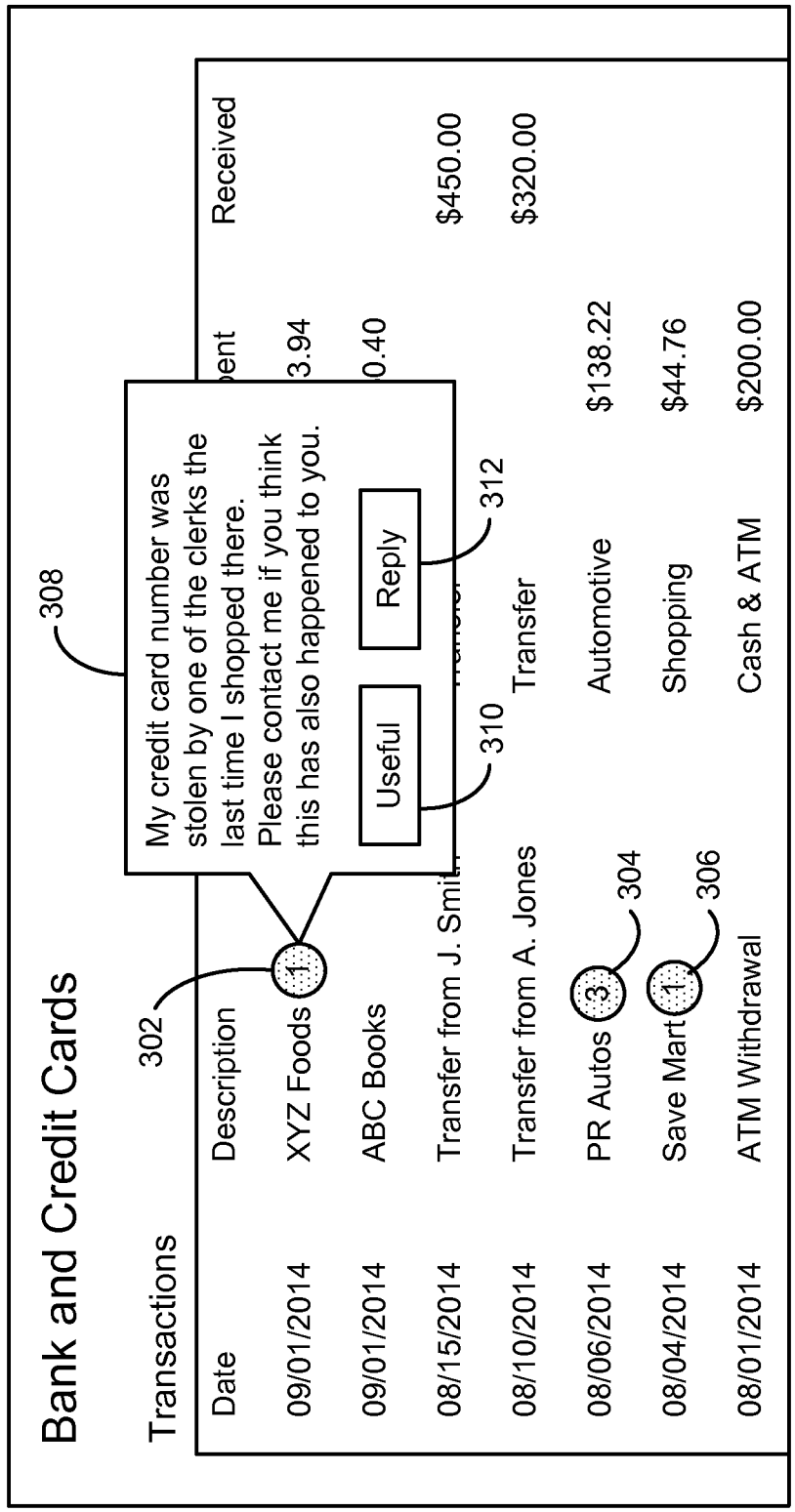
FIG. 3 shows an exemplary screenshot in accordance with the disclosed embodiments.

FIG. 3 shows an exemplary screenshot in accordance with the disclosed embodiments. More specifically, FIG. 3 shows a screenshot of a GUI for delivering a message to a user, such as a GUI of an offering that performs tasks using financial data for the user.

More specifically, the GUI includes a list of financial transactions associated with the user, such as recent financial transactions involving the user's bank and credit card accounts. The list may include transaction attributes such as a date, description, category, amount spent, and/or amount received for each financial transaction. The financial transactions may be sorted by various transaction attributes of the financial transactions. For example, the user may select the header of each column in the list to sort the financial transactions by the corresponding transaction attribute. The GUI may thus be provided by a financial-management application that aggregates the financial transactions from the user's online accounts with one or more financial institutions and provides the aggregated data for use in creating a budget, tracking finances and spending, performing payroll, scheduling payments and transfers, and/or performing other tasks.

Within the GUI, a number of user-interface elements 302-306 are displayed. User-interface elements 302-306 may be positioned next to financial transactions in the list for which related new messages have been received. In addition, user-interface elements 302-306 may specify the number of messages associated with the corresponding financial transactions. For example, user-interface element 302 may indicate that one new message has been received for the financial transaction with the description of "XYZ Foods," user-interface element 304 may indicate that three new messages have been received for the financial transaction with the description of "PR Autos," and user-interface element 306 may indicate that one new message has been received for the financial transaction with the description of "Save Mart." As a result, user-interface elements 302-306 may be indicators of messages from other users that are related to the transaction dates, descriptions, categories, amounts spent, and/or amounts received of the corresponding financial transactions.

The user may select user-interface elements 302-306 to view the corresponding messages. For example, a user-interface element 308 is displayed next to user-interface element 302, indicating that the user has selected user-interface element 302 to view the new message related to the "XYZ Foods" financial transaction. In response to the selected user-interface element 302, the GUI may display the message within user-interface element 308. If a user-interface element (e.g., user-interface element 304) indicates multiple new messages for the corresponding financial transaction, the GUI may allow the user to scroll and/or otherwise navigate among the messages.

The GUI may also provide two user-interface elements 310-312 for obtaining input from the user based on the message shown in user-interface element 308. The user may select user-interface element 310 (e.g., "Useful") to indicate that the message is useful or relevant to the user. Input received through user-interface element 310 from the user and/or other users may be used to verify or update the relevance of the message to the users and/or subsequent verifications (e.g., verifications 218 of FIG. 2) of message relevance by the data-management system.

The user may select user-interface element 312 (e.g., "Reply") to reply to the message. For example, the user may select user-interface element 312 to navigate to a different screen of the GUI and/or access an overlay that allows the user to compose and submit a response to the message. The response may then be transmitted to the creator of the message and/or other users to whom the message was delivered. User-interface element 312 may thus be used by the users to generate a discussion thread related to the message shown in user-interface element 308 and/or other recipient attributes (e.g., recipient attributes 228 of FIG. 2) associated with the message. Because such communication occurs within offerings with access to the users' financial transactions instead of conventional electronic messaging mechanisms (e.g., email, phone, voicemail, text message, instant message, video calling, etc.), the users may communicate with each other in ad hoc, attribute-based groups without obtaining or exchanging PII with one another.

Figure 4:
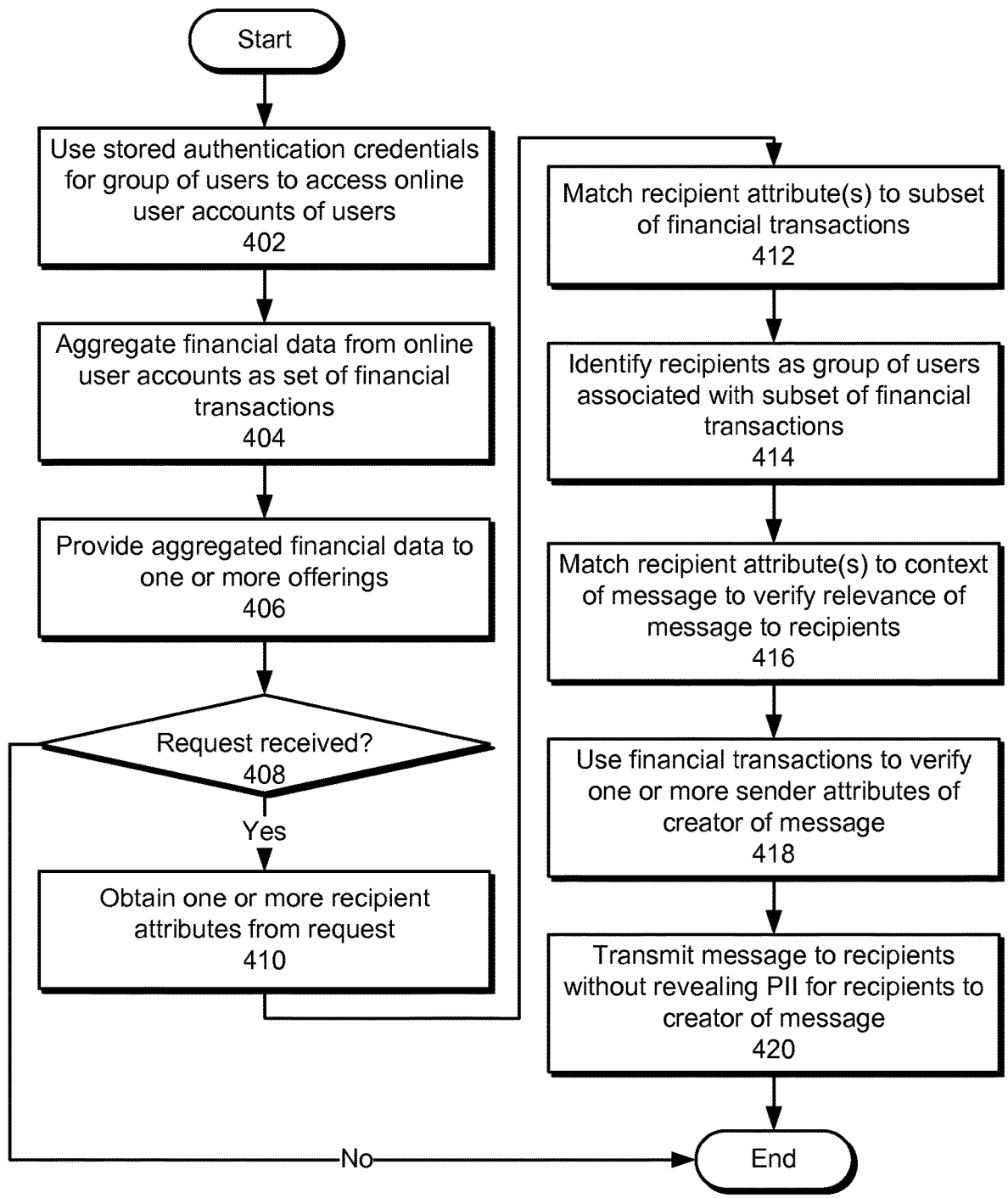
FIG. 4 shows a flowchart illustrating the process of facilitating electronic communication among users in accordance with the disclosed embodiments.

FIG. 4 shows a flowchart illustrating the process of facilitating electronic communication among users in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

Initially, financial data is obtained for a group of users. The financial data may be obtained by using stored authentication credentials for the group of users to access online user accounts of the users (operation 402). The authentication credentials may be obtained from the user during configuration of an offering and/or data-management system (e.g., data-management system 102 of FIG. 1) that aggregates financial data from the online user account. For example, the user may provide the authentication credentials to the offering and/or data-management system to enable use of financial data from the online user account by the offering. Alternatively, the financial data may be obtained from a third party through dedicated interfaces using authorization by the user and without requiring the user's authentication credentials with the third party.

Next, the financial data is aggregated from the online user accounts as a set of financial transactions (operation 404). A batch process may periodically aggregate the financial data from user accounts of multiple users independently of access to the aggregated financial data by the users, or the financial data may be aggregated on demand (e.g., when a user refreshes the financial data within an offering). During aggregation of the financial data, a predefined user flow may be used to navigate to one or more web pages containing the financial data, and the financial data may be scraped from the web page(s).

The aggregated financial data may also be provided to one or more offerings (operation 406). The offering(s) may be web applications, native applications, mobile applications, and/or other software offerings that perform tasks using the aggregated financial data. For example, the offering(s) may allow the user to file taxes, manage finances, create a budget, run payroll, and/or pay bills.

A request to transmit a message within the group may be received (operation 408). The request may be received from a user in the group. For example, the user may generate the request after creating the message for delivery to a given set of recipients. Alternatively, the request may be generated from public content, as described in further detail below with respect to FIG. 5. If a request is not received or produced, electronic messaging within the group may be omitted.

If a request is received, one or more recipient attributes are obtained from the request (operation 410). The recipient attributes may specify a business relationship and/or a transaction attribute such as a transaction name, type, amount, date, description, and/or status. In other words, the recipient attributes may include information that can be extracted from the financial transactions.

Next, the financial transactions are used to identify a set of recipients that matches the recipient attribute(s). In particular, the recipient attribute(s) are matched to a subset of the financial transactions (operation 412), such as financial transactions that contain the recipient attribute(s), and the recipients are identified as a group of users associated with the subset of financial transactions (operation 414). For example, a creator of the message may specify the recipient attributes as customers who have spent more than $100 at a local merchant in the previous week. The recipient attributes may be used as filters to identify a set of financial transactions of more than $100 spent at the local merchant in the last seven days. Recipients of the message may then be identified as the user accounts with one or more offerings that are associated with the identified financial transactions.

The recipient attribute(s) may also be matched to a context of the message to verify the relevance of the message to the recipients (operation 416). The context may include the source of the message, metadata for the message, the content of the message, topics in the message, and/or information displayed with (e.g., in the same web page as) the message. If the context overlaps sufficiently with the recipient attribute(s), the message may be verified as relevant to the recipients. For example, the message may be identified as relevant to the recipients if the message is related to a business relationship, merchant, product, service, and/or other recipient attributes from the request. Alternatively, verification of the message's relevance may be skipped if the context is used to populate the request with the recipient attributes, as described below with respect to FIG. 5.

The financial transactions are further used to verify one or more sender attributes of a creator of the message (operation 418). Like the recipient attributes, the sender attributes may include information that can be extracted from financial transactions of the creator. The sender attributes may also include some or all of the recipient attributes. For example, the sender attributes may include the same business relationship with a merchant as the recipient attributes. As a result, the creator of the message (e.g., a user requesting transmission of the message to the recipients) may be verified to also have conducted business with the merchant before the message is transmitted.

Finally, the message is transmitted to the recipients without revealing PII for the recipients to the creator of the message (operation 420). For example, the message may be delivered to the recipients through one or more offerings that perform tasks using the aggregated financial data instead of conventional electronic messaging mechanisms such as email, phone, voicemail, text message, instant message, and/or video calling.

Figure 5:
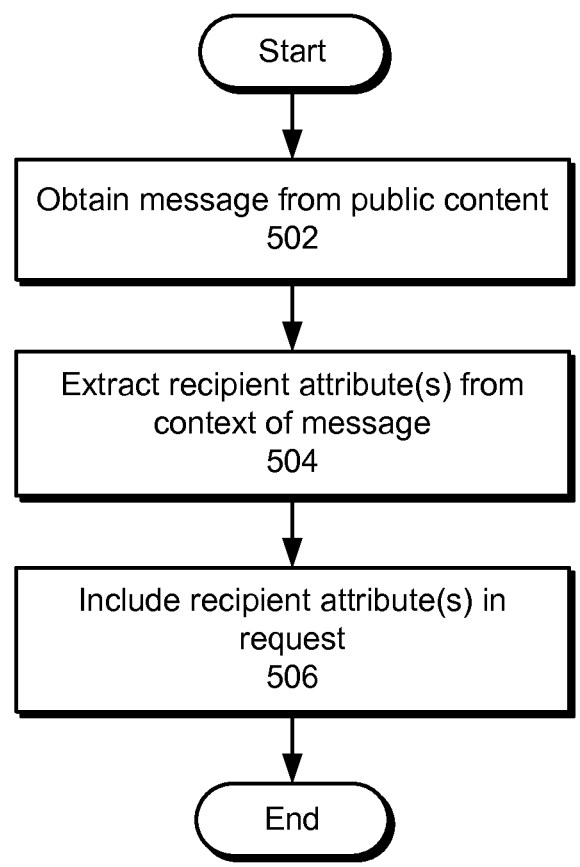
FIG. 5 shows a flowchart illustrating the process of generating a request to transmit a message within a group of users in accordance with the disclosed embodiments.

FIG. 5 shows a flowchart illustrating the process of generating a request to transmit a message within a group of users in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

First, the message is obtained from public content (operation 502). For example, the message may be obtained as a publicly accessible social media post, review, complaint, article, announcement, offer, and/or advertisement. Next, one or more recipient attributes are extracted from the context of the message (operation 504). The recipient attributes may include a business relationship (e.g., customer relationship, employment relationship, borrowing relationship, landlord-tenant relationship, etc.) and/or a transaction attribute (e.g., transaction date, transaction type, transaction description, transaction category, transaction status, etc.) of a financial transaction. The context of the message may include the content of the message, topics in the message, metadata for the message, the source of the message, and/or other information displayed or obtained with the message.

Finally, the recipient attribute(s) are included in the request (operation 506). For example, a data-management system such as data-management system 102 of FIG. 1 may generate the request so that relevant public content is delivered to users of one or more offerings connected to the data-management system. For example, the request may be generated to deliver an announcement of a product recall to all users who have purchased the product. The request may then be processed by using financial transactions of the users and the recipient attribute(s) to identify a set of recipients of the message and transmit the message to the recipients, as discussed above.

Figure 6:
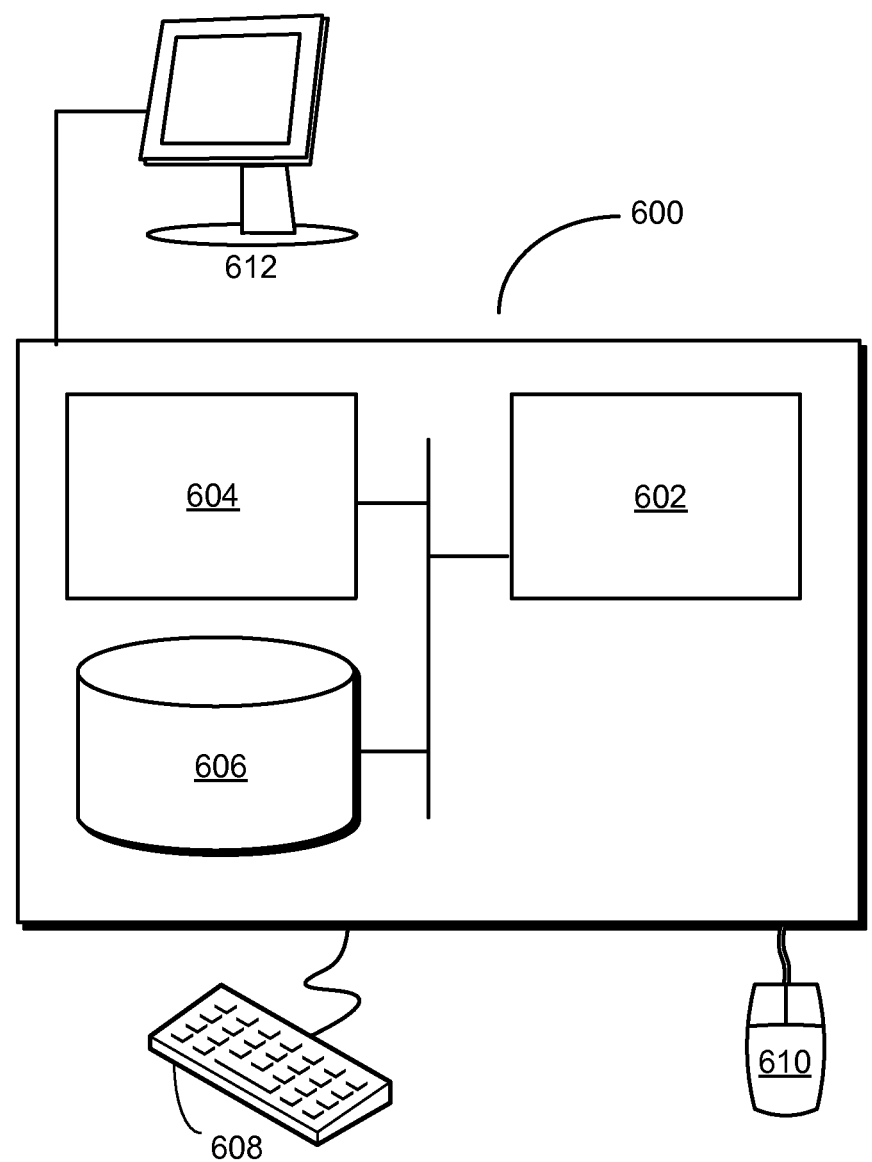
FIG. 6 shows a computer system in accordance with the disclosed embodiments.

FIG. 6 shows a computer system 600 in accordance with the disclosed embodiments. Computer system 600 includes a processor 602, memory 604, storage 606, and/or other components found in electronic computing devices such as personal computers, laptop computers, workstations, servers, mobile phones, tablet computers, and/or portable media players. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the disclosed embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for facilitating electronic communication among users that lack PII for one another. The system may include an aggregation apparatus that obtains financial data as a set of financial transactions. The system may also include a processing apparatus. Upon receiving a request to transmit a message, the processing apparatus may obtain one or more recipient attributes from the request. Next, the processing apparatus may use the financial transactions to identify a set of recipients that matches the one or more recipient attributes. The processing apparatus may then transmit the message to the set of recipients without revealing the PII for the set of recipients to a creator of the message.

In addition, one or more components of computer system 600 may be remotely located and connected to the other components over a network. Portions of the present embodiments (e.g., aggregation apparatus, processing apparatus, financial data repository, offerings, etc.) may also be located on different nodes of a distributed system that implements the embodiments. For example, the present embodiments may be implemented using a cloud computing system that aggregates financial data from online user accounts of a set of remote users and provides the aggregated financial data and related messages to one or more offerings used by the remote users.

Figure 7:
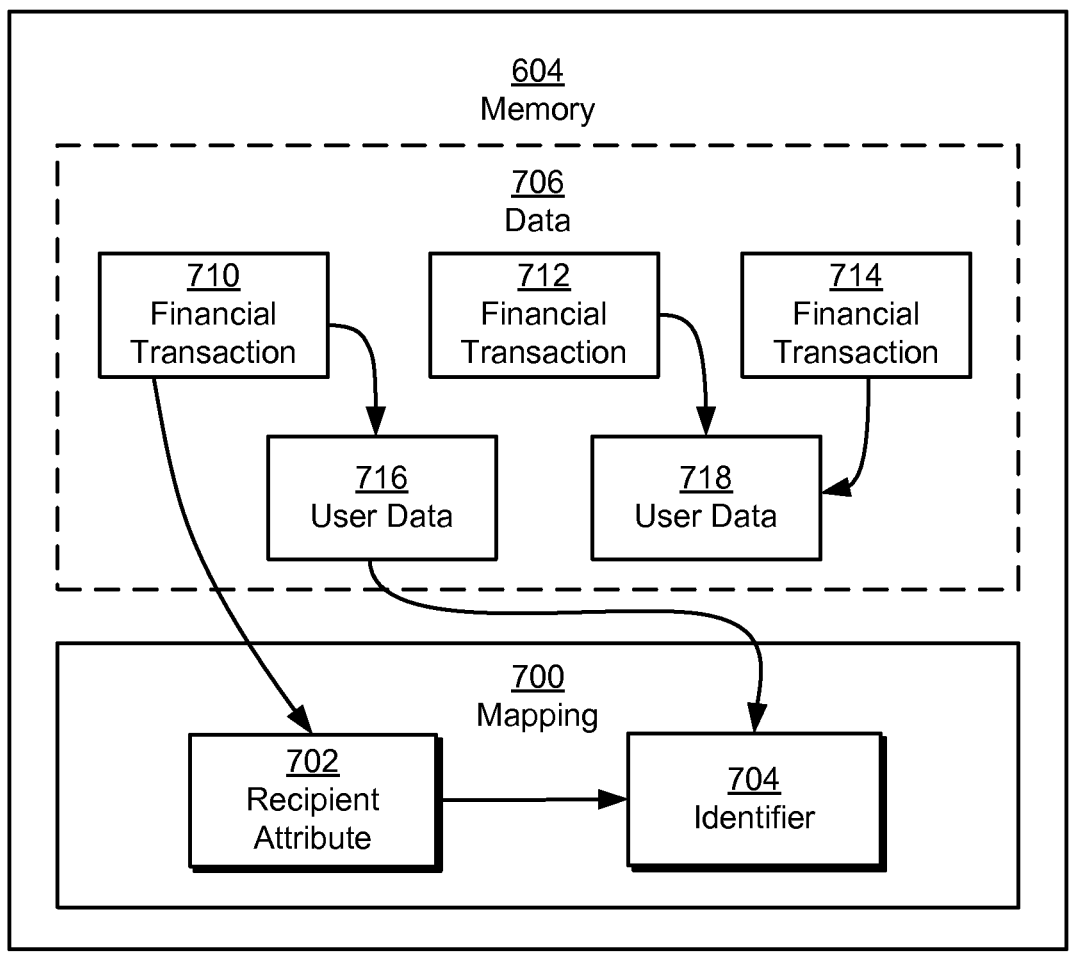
FIG. 7 shows a set of data structures stored in a memory of a computer system in accordance with the disclosed embodiments.

FIG. 7 shows a set of data structures stored in memory 604 of computer system 600 in accordance with the disclosed embodiments. The data structures include a set of data 706 in memory 604. Data 706 includes a number of financial transactions 710-714 linked to user data 716-718 for a number of users. Financial transactions 710-714 may be aggregated from online user accounts of the users and stored in memory 604. Financial transactions 710-714 may also be associated with user data 716-718 to identify users involved in financial transactions 710-714. For example, foreign keys and/or other mapping mechanisms may be used to associate financial transaction 710 with user data 716 for one user and financial transactions 712-714 with user data 718 for another user.

The data structures also include a mapping 700 of a recipient attribute 702 from financial transaction 710 to an identifier 704 from user data 716. Mapping 700 may identify the user associated with user data 716 as a recipient of a message associated with recipient attribute 702. For example, mapping 700 may be generated in response to a request to transmit the message. After the message is received, recipient attribute 702 may be obtained from the message and matched to financial transaction 710. The association between financial transaction 710 and user data 716 may then be used to obtain identifier 704 for the user and generate mapping 700. Finally, mapping 700 may be used to transmit the message to the user.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for facilitating electronic communication among a group of users, wherein each user in the group of users lacks personally identifying information (PII) for other users in the group of users, comprising: receiving, at a messaging system, a request to transmit a message from a creator of the message, wherein the creator of the message is a user of the messaging system;
   extracting, from the message, a context of the message comprising message creation time, message source and message content;
   extracting, from the message, recipient attributes associated with the request, the recipient attributes comprising at least one of relationships between users or transaction attributes of users;
   verifying the recipient attributes based on the context of the message;
   obtaining transaction information for a plurality of users including the creator, the transaction information comprising transaction dates, transaction amounts, transaction types and transaction categories;
   identifying among the plurality of users a set of recipients of users of a financial management application with transaction information that matches the recipient attributes;
   transmitting, by the messaging system, the message to a first portion of the set of recipients over the network to instances of the financial management application executing on computing devices associated with members of the first portion of the set of recipients, without revealing the PII for the set of recipients to the creator of the message;
   aggregating, by the messaging system, financial transactions of a plurality of online accounts associated with the first portion of the set of recipients to form lists of financial transactions, wherein the message is displayed in the instances of the financial management application as a UI element next to particular financial transactions of the lists of financial transactions for which the message is received,
   providing, in the instances of the financial management application, voting UI elements to the members of the first portion of the set of recipients, wherein the voting UI elements are configured to allow the set of recipients to vote on a relevance of the message;
   determining, based on votes received from the members of the first portion of the set of recipients, that the message is not relevant to the set of recipients;
   updating the messaging system to prevent transmission of messages from the creator of the message to the set of recipients.

2. The method of claim 1, further comprising using the transaction information to identify the set of recipients that matches the recipient attributes, by:
   storing the recipient attributes in memory; and
   storing, in memory, a mapping of the recipient attributes to a set of identifiers for the set of recipients.

3. The method of claim 1, further comprising:
   using the transaction information to verify sender attributes of the creator prior to transmitting the message to the set of recipients.

4. The method of claim 3, wherein the sender attributes comprise a first recipient attribute in the recipient attributes.

5. The method of claim 1, further comprising:
   matching the recipient attributes to the context of the message to verify the relevance of the message to the set of recipients prior to transmitting the message to the set of recipients.

6. The method of claim 1, wherein obtaining the transaction information comprises:
   using stored authentication credentials for the group of users to access online user accounts of the users; and
   aggregating the transaction information from a set of online user accounts.

7. The method of claim 1, further comprising using the transaction information to identify the set of recipients that matches the recipient attributes, by:
   matching the recipient attributes to a subset of the transaction information; and
   identifying the set of recipients as one or more users associated with the subset of the transaction information.

8. The method of claim 1, wherein transmitting the message to the set of recipients comprises:
   delivering the message to the set of recipients through one or more offerings that perform tasks using the transaction information.

9. The method of claim 1, further comprising:
   obtaining the message from public content;
   extracting the recipient attributes from the context of the message; and
   including the recipient attributes in the request.

10. The method of claim 1, wherein the recipient attributes comprise a business relationship.

11. The method of claim 1, wherein the recipient attributes comprise a transaction attribute of the transaction information.

12. An apparatus, comprising:
   one or more processors; and
   memory storing instructions that, when executed by the one or more processors, cause the apparatus to:
      receive, at a messaging system, a request to transmit a message from a creator of the message, wherein the creator of the message is a user of the messaging system;
      extract, from the message, a context of the message comprising message creation time, message source and message content;
      extract, from the message, recipient attributes associated with the request, the recipient attributes comprising at least one of relationships between users or transaction attributes of users;
      verify the recipient attributes based on the context of the message;
      obtain transaction information for a plurality of users including the creator, the transaction information comprising transaction dates, transaction amounts, transaction types and transaction categories;
      identify among the plurality of users a set of recipients of users of a financial management application with transaction information that matches the recipient attributes;
      transmit, by the messaging system, the message to a first portion of the set of recipients over the network to instances of the financial management application executing on computing devices associated with members of the first portion of the set of recipients, without revealing the PII for the set of recipients to the creator of the message;
      aggregate, by the messaging system, financial transactions of a plurality of online accounts associated with the first portion of the set of recipients to form lists of financial transactions, wherein the message is displayed in the instances of the financial management application as a UI element next to particular financial transactions of the lists of financial transactions for which the message is received;

provide, in the instances of the financial management application, voting UI elements to the members of the first portion of the set of recipients, wherein the voting UI elements are configured to allow the set of recipients to vote on a relevance of the message;

determine, based on votes received from the members of the first portion of the set of recipients, that the message is not relevant to the set of recipients;

update the messaging system to prevent transmission of messages from the creator of the message to the set of recipients.

13. The apparatus of claim 12, wherein the memory further stores instructions that, when executed by the one or more processors, cause the apparatus to:

use the transaction information to verify sender attributes of the creator prior to transmitting the message to the set of recipients.

14. The apparatus of claim 13, wherein the sender attributes comprise a first recipient attribute in the recipient attributes.

15. The apparatus of claim 12, wherein the memory further stores instructions that, when executed by the one or more processors, cause the apparatus to: match the recipient attributes to the context of the message to verify the relevance of the message to the set of recipients prior to transmitting the message to the set of recipients.

16. The apparatus of claim 12, wherein the memory further stores instructions that, when executed by the one or more processors, cause the apparatus to use the transaction information to identify the set of recipients that matches the recipient attributes, by:

matching the recipient attributes to a subset of the transaction information; and identifying the set of recipients as one or more users associated with the subset of the transaction information.

17. The apparatus of claim 12, wherein transmitting the message to the set of recipients comprises: delivering the message to the set of recipients through one or more offerings that perform tasks using the transaction information.

18. The apparatus of claim 12, wherein the memory further stores instructions that, when executed by the one or more processors, cause the apparatus to:

obtain the message from public content;

extract the recipient attributes from the context of the message; and include the recipient attributes in the request.

19. A non-transitory computer-readable storage medium storing instructions that when executed by a computer cause the computer to perform a method for facilitating electronic communication among a group of users, wherein each user in the group of users lacks personally identifying information (PII) for other users in the group of users, the method comprising:

receiving, at a messaging system, a request to transmit a message from a creator of the message, wherein the creator of the message is a user of the messaging system;

extracting, from the message, a context of the message comprising message creation time, message source and message content;

extracting, from the message, recipient attributes associated with the request, the recipient attributes comprising at least one of relationships between users or transaction attributes of users;

verifying the recipient attributes based on the context of the message;

obtaining transaction information for a plurality of users including the creator, the transaction information comprising transaction dates, transaction amounts, transaction types and transaction categories;

identifying among the plurality of users a set of recipients of users of a financial management application with transaction information that matches the recipient attributes;

transmitting, by the messaging system, the message to a first portion of the set of recipients over the network to instances of the financial management application executing on computing devices associated with members of the first portion of the set of recipients, without revealing the PII for the set of recipients to the creator of the message;

aggregating, by the messaging system, financial transactions of a plurality of online accounts associated with the first portion of the set of recipients to form lists of financial transactions, wherein the message is displayed in the instances of the financial management application as a UI element next to particular financial transactions of the lists of financial transactions for which the message is received;

providing, in the instances of the financial management application, voting UI elements to the members of the first portion of the set of recipients, wherein the voting UI elements are configured to allow the set of recipients to vote on a relevance of the message;

determining, based on votes received from the members of the first portion of the set of recipients, that the message is not relevant to the set of recipients;

updating the messaging system to prevent transmission of messages from the creator of the message to the set of recipients.

20. The non-transitory computer-readable storage medium of claim 19, the method further comprising: using the transaction information to verify sender attributes of the creator prior to transmitting the message to the set of recipients.

* * * * *